United States Patent [19]

Strang, Sr.

[11] 4,315,803
[45] Feb. 16, 1982

[54] BAFFLE FOR ALCOHOL STILLS

[75] Inventor: Robert E. Strang, Sr., North Libert, Ind.

[73] Assignee: Injection Plastics & Manufacturing Co., LaPaz, Ind.

[21] Appl. No.: 225,022

[22] Filed: Jan. 14, 1981

Related U.S. Application Data

[63] Continuation-in-part of Ser. No. 172,752, Jul. 28, 1980, Pat. No. 4,273,618.

[51] Int. Cl.³ .............................................. B01D 3/02
[52] U.S. Cl. ............................ 202/158; 261/114 R; 261/114 TC
[58] Field of Search ............... 261/113, 114 R, 114 A, 261/114 JP, 114 TC, 114 VT; 202/158, 163, 270

[56] References Cited

U.S. PATENT DOCUMENTS

| | | | |
|---|---|---|---|
| 2,080,167 | 5/1937 | DaValle | 202/158 |
| 2,290,055 | 7/1942 | Kinsey | 261/114 R X |
| 2,967,699 | 1/1961 | Brown | 202/158 X |
| 3,262,684 | 7/1966 | Smith | 202/158 X |
| 3,367,638 | 2/1968 | Leva | 261/113 |
| 3,928,513 | 12/1975 | Leva | 261/114 TC X |
| 4,062,662 | 12/1977 | Kuxdorf et al. | 261/113 X |
| 4,238,426 | 12/1980 | Slobodyanik | 202/158 X |
| 4,266,949 | 5/1981 | Kuxdorf et al. | 202/158 X |

FOREIGN PATENT DOCUMENTS 2374065  7/1978  France ........................ 261/114 TC Primary Examiner—Richard L. Chiesa
Attorney, Agent, or Firm—Oltsch, Knoblock & Hall

[57] ABSTRACT

A baffle for use in an alcohol still. The baffle is provided with a series of openings spaced and arranged to accommodate substantially even dispersion therethrough of steam at required temperature and pressure. Ribs on the baffle enhance uniformity of flow through openings throughout the baffle.

9 Claims, 14 Drawing Figures

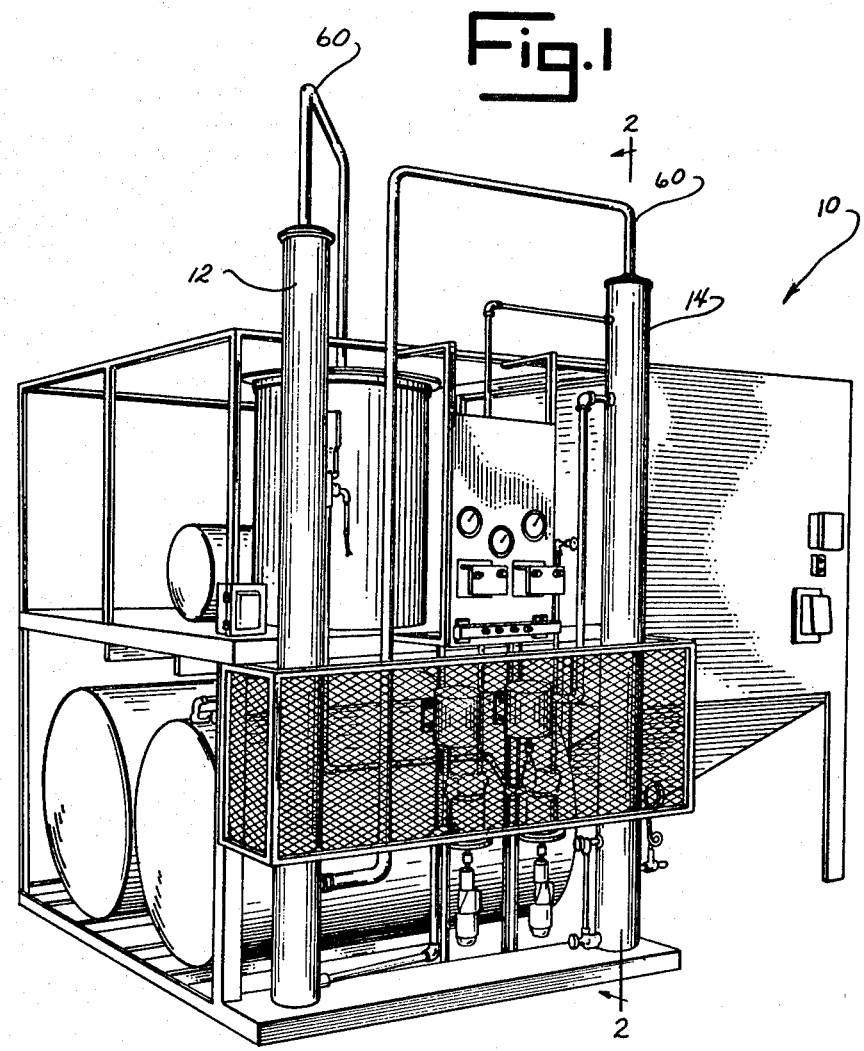

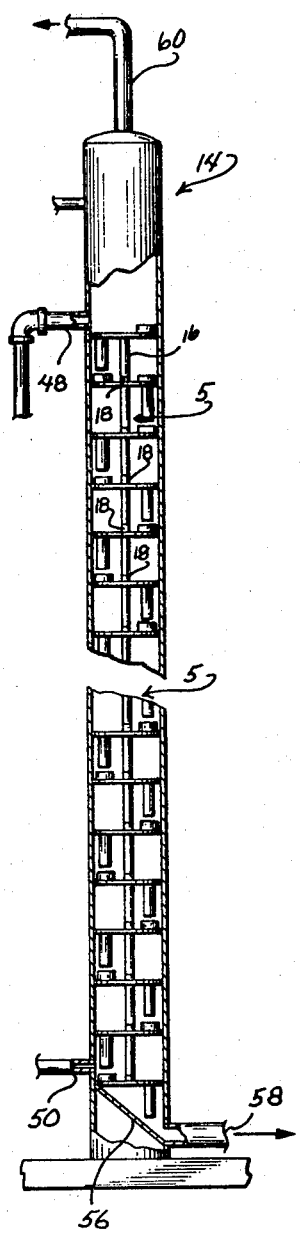
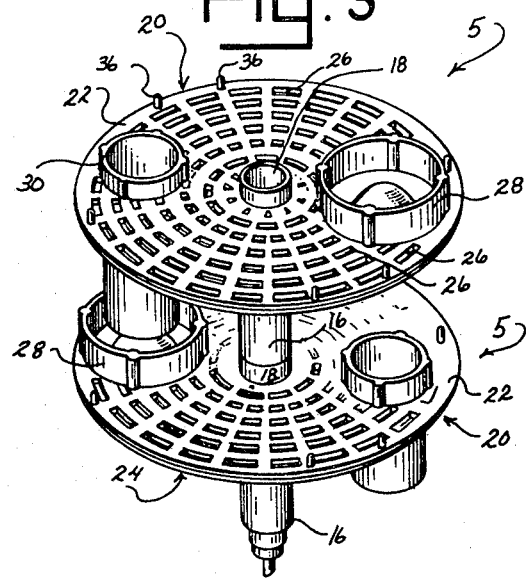
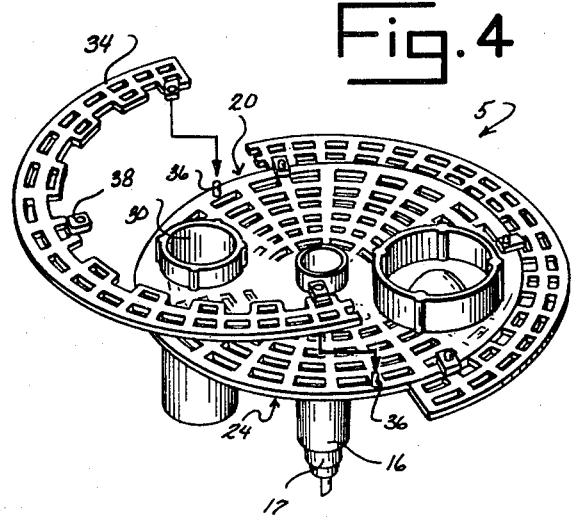

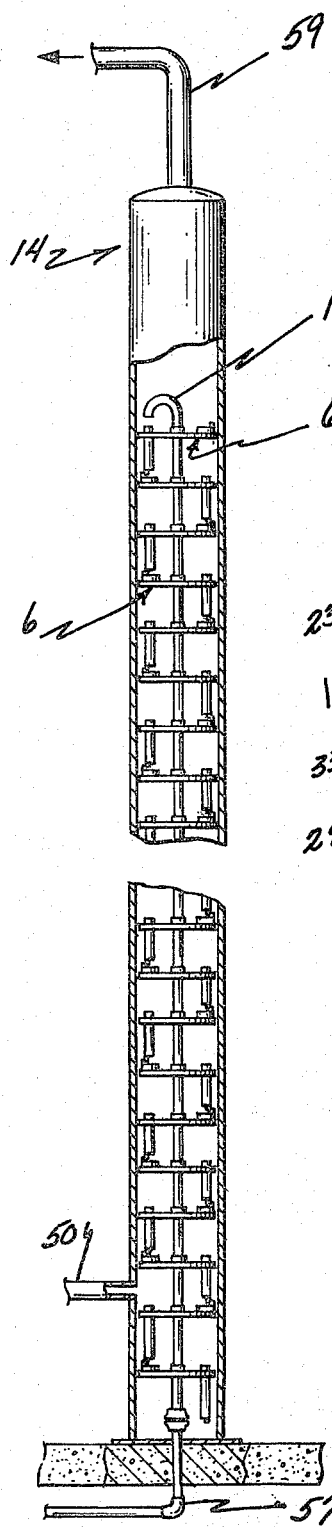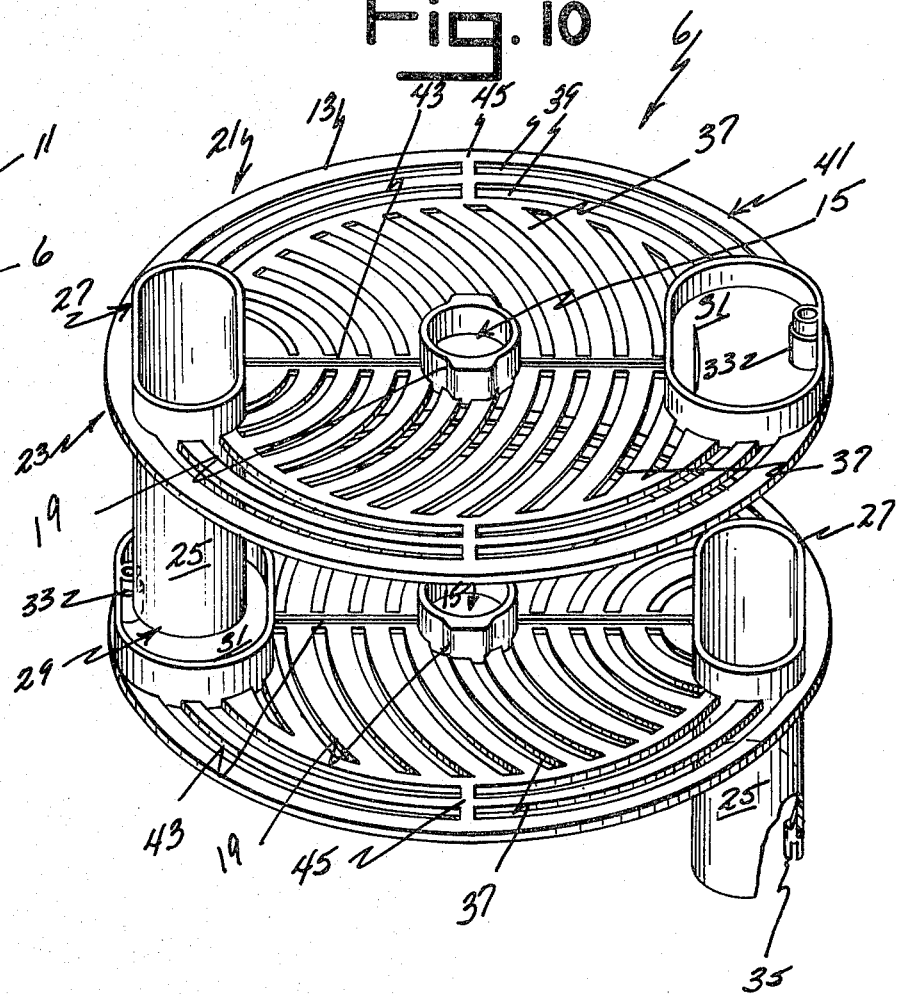

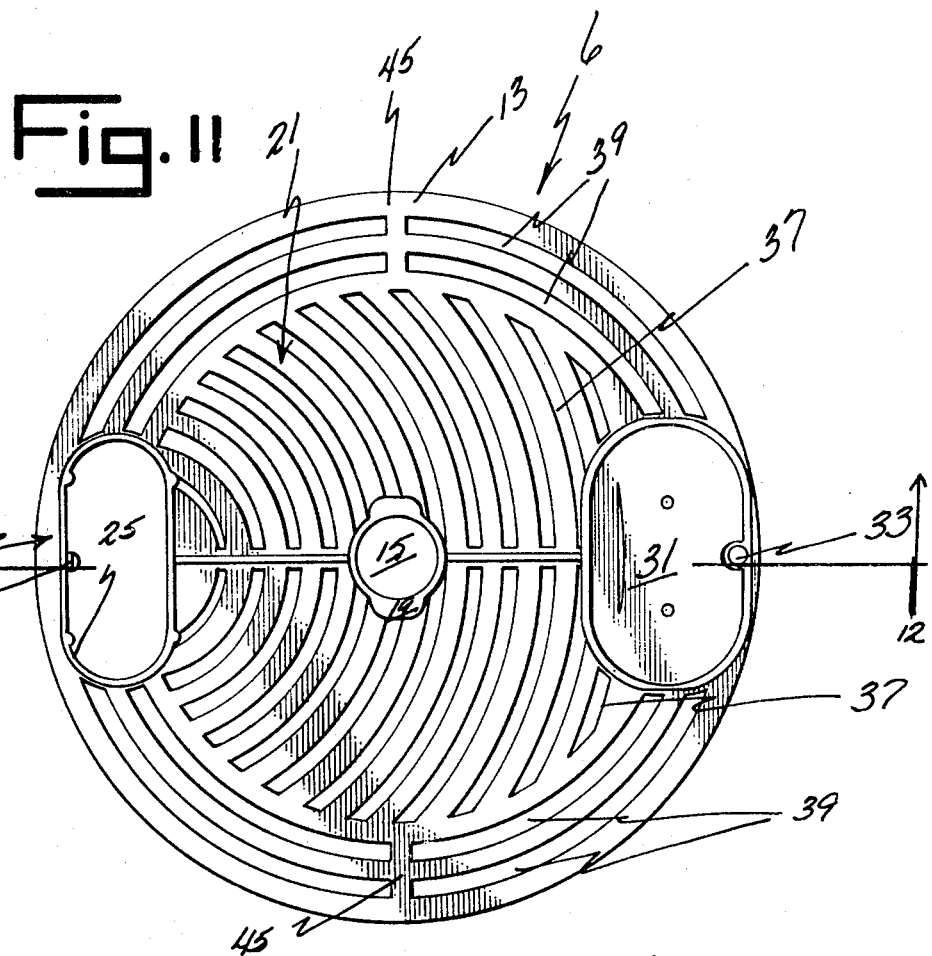
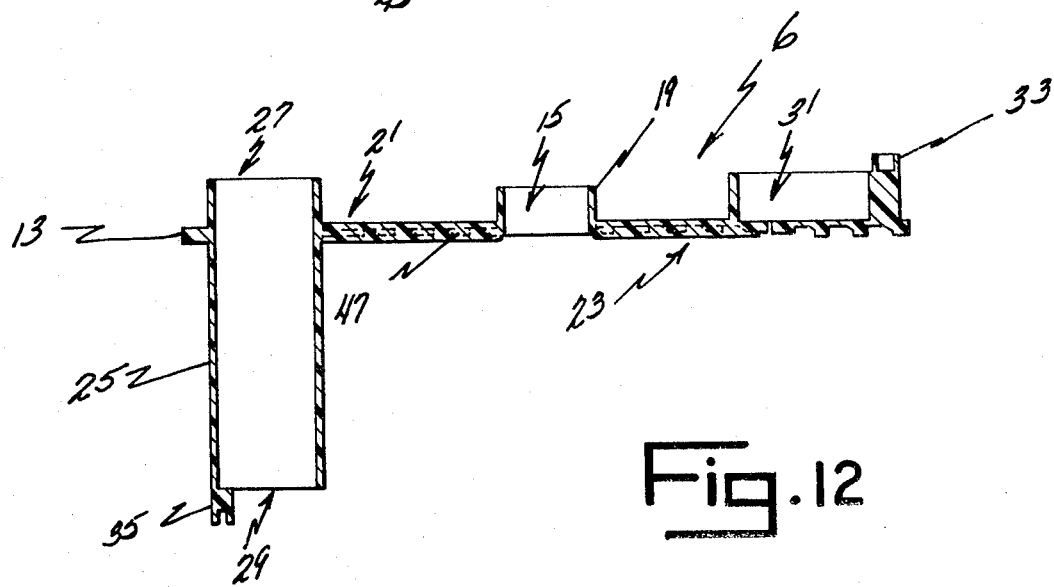

4,315,803

BAFFLE FOR ALCOHOL STILLS

CROSS-REFERENCE TO PRIOR APPLICATION

This application is a continuation in part of application Ser. No. 172,752, filed July 28, 1980 and now U.S. Pat. No. 4,273,618.

SUMMARY OF THE INVENTION

This invention relates to a baffle used in an alcohol still. This invention especially relates to a baffle to be used in the cooking and stripping columns of an alcohol still.

Prior still baffles have generally been formed of metal and have been provided with a plurality of spaced round holes. Such metal baffles have been required in greater number in each still column than the number of baffles necessary with the present invention. Additionally, prior baffles have been subject to a build-up or adhesion of grain and mash upon them which has tended to progressively and increasingly clog the baffle openings. The holes of the prior baffles also have a lesser capacity for steam flow therethrough and have less uniformity of steam flow therethrough than my novel baffle.

The baffle of the present invention is preferably formed of nylon or other suitable molded material, such as polypropylene, and is provided with a plurality of substantially uniformly spaced arcuate openings. There is a graduation of size of the baffle openings located at different parts of the baffle. This graduation of sizes of openings enhances achievement of substantially uniform flow characteristics of steam to act upon the grain supported on the baffles at all levels, thereby facilitating continuous agitation and substantially uniform reaction of the steam and grain. With the continuous agitation of the grain, clogging of the baffle openings is minimized. This allows efficient use of steam and, consequently, accommodates cooking of the grain at lesser steam pressures and lower temperatures than required in prior stills. The low temperature and pressure results in a higher retention of protein in the grain and enhances the value of the cooked grain residue for use as animal feed. Also, the low pressure and temperature of operation of a still with the novel baffles produces fuel efficient operation of a still. Also, more baffles may be utilized in a still column and the still columns may be reduced substantially in height and in diameter compared to still columns provided with prior baffles.

Accordingly, it is an object of this invention to provide an improved simple and economical baffle for use in an alcohol still.

Another object is to provide a baffle which promotes highly efficient and economical production of alcohol.

Another object is to provide a baffle for an alcohol still which permits a still to operate at lower temperature and pressure than a still with baffles of prior types.

Other objects will become obvious upon a reading of the following description.

BRIEF DESCRIPTION OF THE DRAWINGS

FIG. 1 is a perspective view of a still.

FIG. 2 is a vertical cross-sectional view of a cooking column of a still using one embodiment of the baffle, taken on line 2—2 of FIG. 1.

FIG. 3 is a perspective view of two connected baffles of the embodiment in FIG. 1.

FIG. 4 is a perspective view of a baffle with extension parts by which it may be enlarged.

FIG. 9 is a vertical cross-sectional view of a cooking column of a still using a second embodiment of the baffle.

FIG. 10 is a perspective view of a pair of connected baffles of the embodiment of FIG. 9.

FIG. 11 is a top plan view of the baffle of FIG. 10.

FIG. 12 is a vertical cross-sectional view of the baffle taken on line 12—12 of FIG. 11.

DESCRIPTION OF THE PREFERRED EMBODIMENTS

Figure 5:
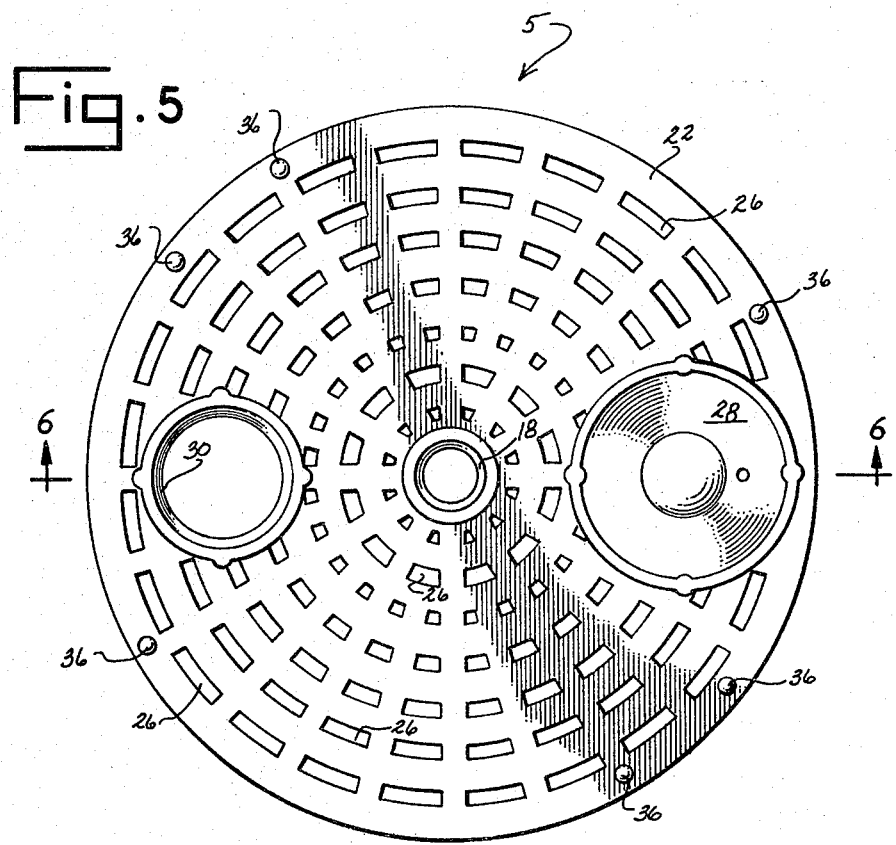
FIG. 5 is a top plan view of the baffle shown in FIGS. 3 and 4.
Figure 6:
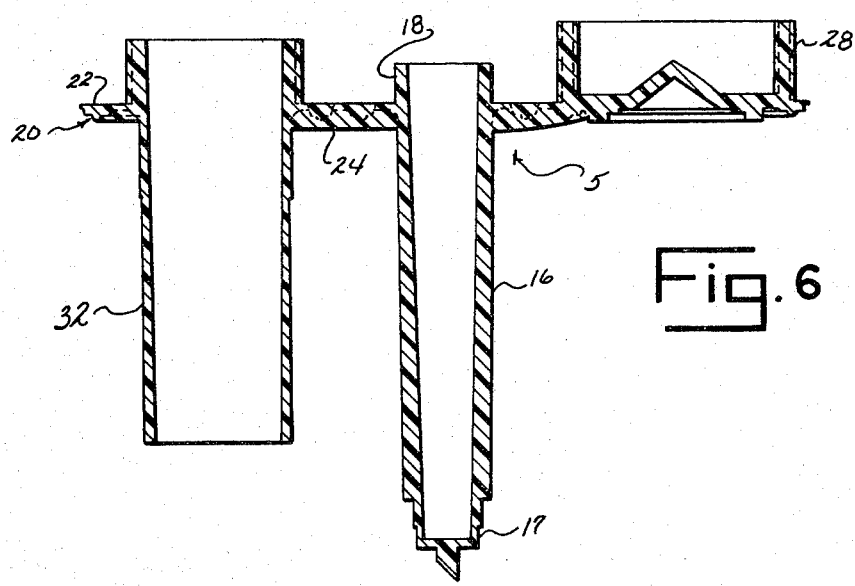
FIG. 6 is a vertical cross-sectional view of the baffle taken on line 6—6 of FIG. 5.
Figure 7:
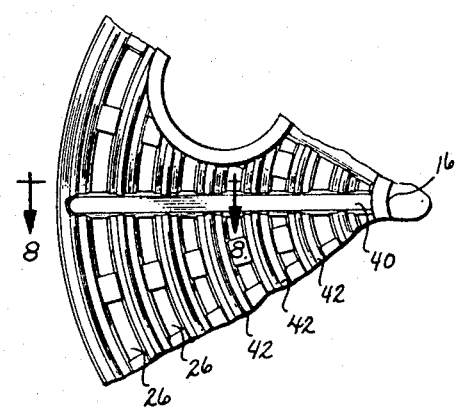
FIG. 7 is a fragmentary bottom plan view of the baffle shown in FIGS. 3 and 4.
Figure 8:
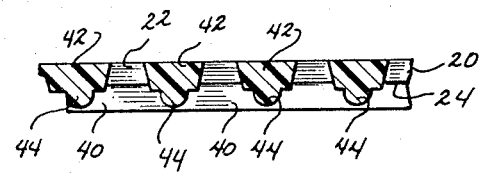
FIG. 8 is a fragmentary cross-sectional view of the baffle taken on line 8—8 of FIG. 7.

The preferred embodiments illustrated are not intended to be exhaustive or to limit the invention to the precise forms disclosed. They are chosen and described in order to best explain the principles of the invention and its application and practical use and to thereby enable others skilled in the art to best utilize the invention.

Baffle 5 is preferably molded of nylon, such as Zytel 70-G 33HRL, and is utilized in columns 12, 14 of alcohol still 10. Baffle 5 may be formed of any other molded material such as polypropylene, found suitable to function at required temperature and pressure and inert under operating conditions existing in an alcohol still. As shown in the drawings, baffles 5 are stacked one atop another within a still column.

Each baffle constitutes a molded substantially flat and rigid disc 20 having an integral central axial tubular part 16 with a reduced lower end part 17. The central tubular part 16 includes an upper open end 18 projecting above the disc 20 and an elongated portion extending below the disc. Body 20 of each baffle has an upper cooking surface 22 and lower refracting surface 24.

A second tubular portion 30, open at its ends, is formed integrally with disc body 20 spaced from tube part 16. The upper end of tube 30 projects above top disc surface 22. The lower end 32 of tube 30 projects below bottom disc surface 24 a distance slightly less than the spacing of cup portion 17 below disc surface 24. At a point opposite to tube part 30 an integral cup-shaped part 28 of larger diameter than the lower end of tube part 32 is formed integrally with disc body 20 and projects upwardly therefrom.

Body 20 is interrupted by a plurality of substantially concentric spaced series of spaced apertures 26. Apertures 26 are preferably substantially arcuate and of graduated sizes in different series so that the proportion of the area of any apertured circular section of the disc which is open at said apertures is substantially equal to the proportion of the area which is open at apertures in other apertured circular sections.

A plurality of radial ribs 40 are formed integrally with disc body 30 and project from the bottom refracting surface 24. Also a plurality of integral concentric ribs 42 project from the bottom surface of body 20 between concentric series of apertures 26, which ribs may have rounded edges 44 for steam dispersement.

Each disc 5 preferably has a plurality of integral upwardly projecting spaced pins 36 adjacent its outer edge. Pins 36 provide means for attachment of arcuate apertured adapters 34 to the baffle to accommodate enlargement of the size of the baffle so as to span a column of larger diameter than the diameter of baffle disc 20. Each arcuate adapter 34 has a plurality of integral upwardly offset apertured ears 38 each adapted to overlie the margin of a disc 20 adjacent a pin 36 and each adapted to fit around a pin to anchor the adapter 34 to the baffle disc 20 in substantially coplanar relation thereto as seen at the right in FIG. 4. Each adapter 34 has one or more arcuate series of spaced apertures 26 formed therein.

To utilize baffles 5 within a still column 12 or 14, a plurality of baffles are interconnected by fitting the lower reduced tube part 17 into the upper end of tube 18 of the next lower disc 5 so the baffles are arranged in concentric uniformly spaced relation. The cup forming part 28 of each baffle is positioned below the lower end of downcomer tube 30 of the baffle thereabove. Mash or grain is fed into the upper end of column 14 through inlet 48.

Pressurized steam is introduced into the lower end of columns 12 and 14 through steam inlets 50. As steam rises in the column it strikes the baffles 20 successively. The concentric ribs 42 and radial ribs 40 serve to retain steam at each area of the bottom refracting surface 24 of each baffle which it strikes, i.e. between the ribs 42 and 40, so as to direct the steam to and through the adjacent baffle apertures 26. The projection of ribs 42 and 40 below the refracting baffle face 24 prevents the steam from flowing radially and laterally along the lower surface of the baffle as occurs characteristically in stills with the prior type of flat metal baffle. Because of this ribbed construction, less steam pressure is needed to cook the grain, and the mash which is supported on upper baffle cooking surfaces 22 is constantly and substantially uniformly agitated by substantially uniform flow of steam therethrough, at each aperture 26. The transverse size or diameter of collection cup 28 is greater than that of downcomer tube 30 which preferably projects therein with clearance. Each collection cup 28 blocks steam from flowing up the adjacent downcomer tube 30. The projection of the upper end of downcomer tube 30 and of cup 28 above each baffle serves to normally retain grain on the apertured cooking surface 22 of each baffle.

As grain is fed onto the uppermost baffle 5, steam passes through it and draws alcohol from it. When the grain or mash on the upper baffle 5 reaches a level greater than the height of the upper end 30 of the downcomer tube 32 the grain or mash flows into and through the downcomer tube 32 and into collection cup 28 of the next lower baffle 5. Upon reaching a level higher than collection cup 28 of the next lower baffle 5, the grain and mash overflows onto the remainder of the cooking surface 22 of that baffle on which it is agitated by steam passing through apertures 26 as it accumulates to a level sufficient to flow into the downcomer tube 32 of that next lower baffle. The cycle continues until the grain reaches the lowest level of the column. Mash flows down inclined deflector plate 56 at the bottom of the column and discharges at mash outlet 58.

The continued flow of steam cooks the mash as the mash moves down column 14 from baffle to baffle and the steam flows upwardly by convection through baffle apertures 26. Alcohol with a high volatility rises up the column and discharges at outlet 60 with the steam.

Figure 13:
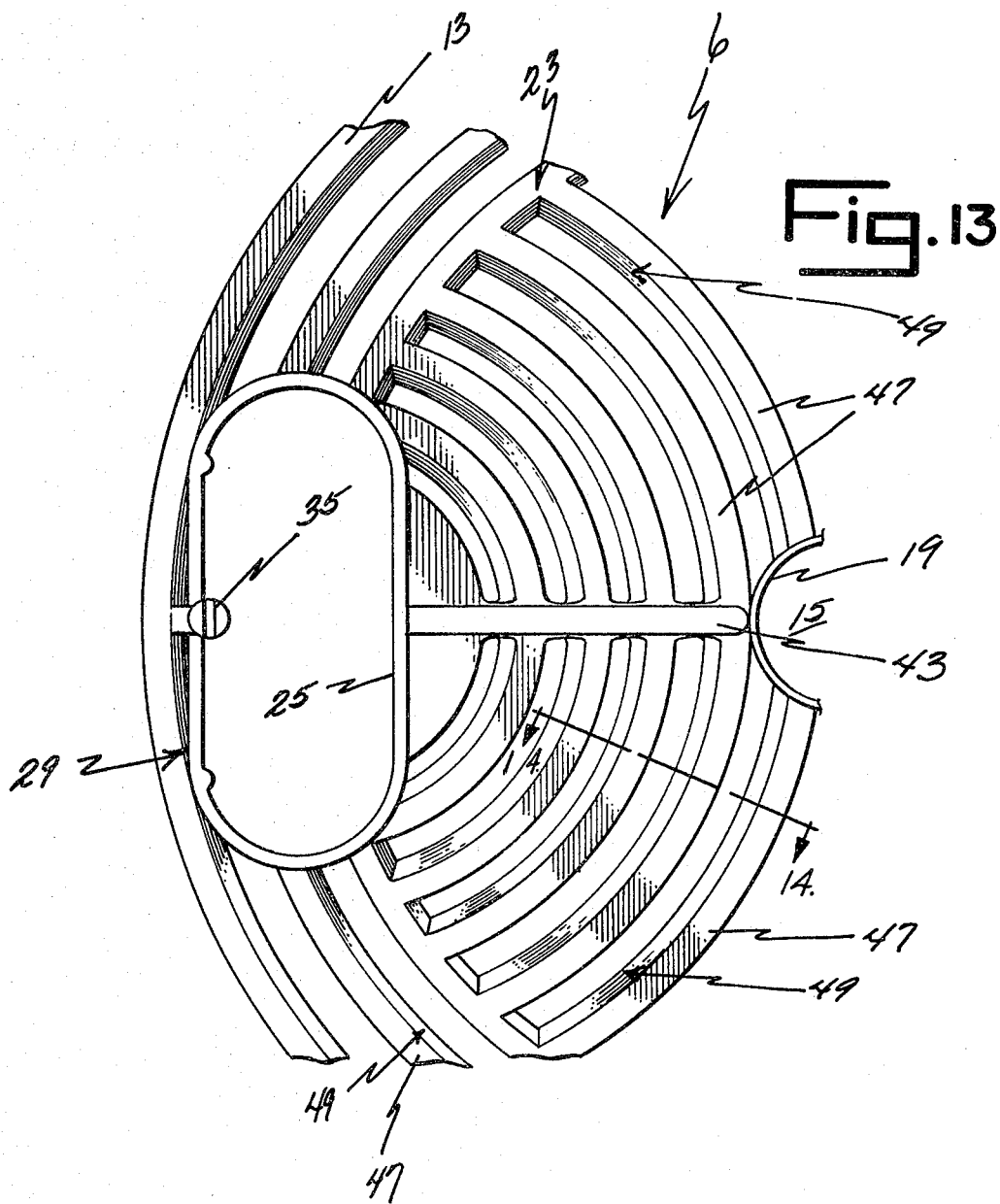
FIG. 13 is an enlarged fragmentary bottom plan view of the baffle of FIG. 9.
Figure 14:
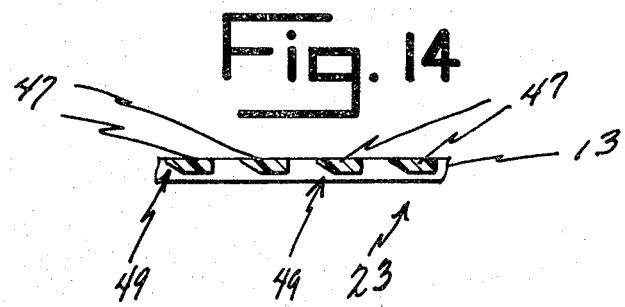
FIG. 14 is a fragmentary cross-sectional view of the baffle taken on line 14—14 of FIG. 13.

A second embodiment of the invention is illustrated in FIGS. 9-14 and utilizes baffles 6. Each baffle 6 is preferably molded of polypropylene, but may be formed of any other molded material found suitable to function at required temperatures and pressures while remaining rigid and inert under alcohol-still-operating conditions. As shown in the drawings, baffles 6 are mounted upon a pipe 11 extending vertically within a still column as shown in FIG. 9.

Each baffle 6 constitutes a molded substantially flat disc 13 with a central opening 15. Opening 15 is defined by a collar 19 extending from disc 13 and fitting around pipe 11. Each disc 13 has an upper cooking surface 21 and a lower refracting surface 23.

A downcomer tube 25, open at its ends is formed integrally with disc 13 and spaced from collar 19. Upper end 27 of downcomer 25 projects above upper disc surface 21 and the lower end 29 of the downcomer projects below refracting surface 23. At a point opposite to downcomer tube 25 on disc 13 a cup 31 larger in size than lower end 29 of a downcomer tube 25 extends upwardly from upper cooking surface 21. Cup 31 has a receptacle 33 formed therein to receive a clip 35 carried by the lower end 29 of a downcomer tube 25.

Disc 13 is interrupted by a plurality of substantially uniformly spaced arcuate apertures 37 which are substantially concentric with downcomer tube 25. Apertures 37 are preferably of graduated sizes progressing from downcomer tube 25 across disc 13 to cup 31. Disc 13 also has a series of arcuate concentric apertures 39 extending in its marginal portion 41. A central radial rib 43 preferably extends from collar 19 to cup 31 and downcomer tube 25 between apertures 37. Radial ribs 45 at the margin of each disc extend between apertures 39.

A plurality of arcuate ribs 47 are formed integrally with disc body 13 and project from lower refracting surface 23 between apertures 37, 39. Each arcuate rib 47 has a beveled surface 49 for directing steam flow upwardly therethrough at an angle directed toward downcomer tube 25.

To utilize baffles 6 within a still column 12 or 14, a series of baffles are interconnected or stacked around pipe 11 which passes through collars 19 at central disc openings 15. A clip 35 projecting downwardly from the lower end 29 of each downcomer tube 25 engages or fits into receptacle 33 of cup 31 of the next lower disc. In this manner downcomer tubes 25 act as spacers between adjacent baffles 6 and insure that a cup 31 is positioned properly below each downcomer tube.

Mash or grain is fed through pipe 11 and discharges at the top of each column during operation of the still. The mash exits from bend 51 of pipe 11 onto the uppermost baffle. Pressurized steam is introduced into the lower end of a column through steam inlet 53. As the steam rises in the column it strikes baffles 6 successively. Arcuate ribs 47 direct the steam through apertures 37, 39. Bevelled surfaces 49 of ribs 47 all are positioned to force the steam in a direction away from cup 31 and toward downcomer tube 25. By directing the steam at an angle toward tube 25 the mash is moved across the baffle from cup 31 to downcomer 25. The mash and grain are agitated upon the baffle by the steam to promote even cooking with minimum required temperature and pressure. As cup 31 overflows, the grain builds up on cooking surface 21 as it moves and is agitated until the level of grain and mash on each baffle exceeds the height of upper end 27 of downcomer tube 25 on that baffle. The mash then overflows into downcomer tube 25 and down into the cup 31 of the next lower baffle. Each cup 31 substantially blocks the passage of steam up and through the associated downcomer 25 of the next higher baffle.

As grain is fed onto the uppermost baffle 6, steam cooks it and draws alcohol from it. This process continues as the mash or grain pass through and from downcomer tube 25 into cup 31 of the next lower baffle and thence across the next lower baffle to its downcomer tube. Upon reaching the bottom 55 of the column, the mash is pumped through outlet 57.

The cooking process in this embodiment continues in a similar manner to that of the preceding embodiment. As the steam ascends from baffle to baffle it becomes laden with alcohol. The highly volatile alcohol is discharged through outlet 59.

Baffle 6 has advantages over baffle 5 due to the steam directing bevel surfaces 49 thereof. As opposed to the round edges 44, of the baffle 65, the bevelled surfaces 49 of baffle 6 promote the flow of mash across the baffle as well as the agitation of the mash.

It is understood that the invention is not to be limited to the above description but may be amended within the scope of the appended claims.

What I claim is:

1. A baffle adapted to be stacked in spaced relation in a vertical tube of an alcohol still, said baffle comprising a body having an upper cooking surface and lower refracting surface and a plurality of concentric series of spaced openings therethrough, a collection cup extending upwardly from said cooking surface, an open-ended downcomer tube carried by said body and projecting above said cooking surface and below said refracting surface, said collection cup and downcomer tube of adjacent baffles being arranged oppositely for alignment of each cup with the downcomer tube of the next higher baffle, one of said openings being substantially concentric with said downcomer tube, said refracting surface having a plurality of substantially radial ribs and a plurality of spaced concentric ribs projecting downwardly from said refracting surface.

2. The baffle of claim 1, wherein said baffle is formed of a molded polyester material inert in the presence of steam and alcohol.

3. The baffle of claim 1, and complementary means respectively carried by the upper end of said cup and the lower end of said downcomer tube and engageable with complementary parts of adjacent stacked baffles to space said baffles.

4. The baffle of claim 3, wherein said last named means include a pin, and a pin-receiving opening respectively.

5. The baffle of claim 1, wherein said openings concentric with said downcomer tube have a beveled surface to direct steam upwardly and toward said downcomer tube.

6. A baffle for an alcohol still, said baffle comprising a body having an upper cooking surface and lower refracting surface and a plurality of spaced arcuate apertures therethrough, a collection cup extending upwardly from said cooking surface, an open-ended downcomer tube carried by said body and projecting above said cooking surface and below said refracting surface, said body having a central opening adapted to fit around a vertical pipe within a vertical column of said still, said collection cup and downcomer tube being arranged oppositely in complementary relation for alignment of each cup with the downcomer tube of an adjacent baffle, said refracting surface having a plurality of spacers between said apertures, said spacers having a beveled surface, and said body having baffle spacing means for spacing adjacent baffles.

7. The baffle of claim 6 wherein said baffle is formed of a molded polyester material inert in the presence of steam and alcohol.

8. The baffle of claim 6, wherein said spacing means includes a pin carried by the lower end of said downcomer tube and a pin-receiving socket carried by said cup.

9. The baffle of claim 6, wherein said beveled surfaces are formed to direct steam upwardly and toward said downcomer tube.

* * * * *